Jan. 13, 1942.　　G. A. CHRISTENSON　　2,269,519
LAND LEVELER
Filed March 14, 1940　　2 Sheets-Sheet 1

INVENTOR:
GEORGE A. CHRISTENSON
BY
ATTORNEYS.

Jan. 13, 1942.　　G. A. CHRISTENSON　　2,269,519
LAND LEVELER
Filed March 14, 1940　　2 Sheets-Sheet 2
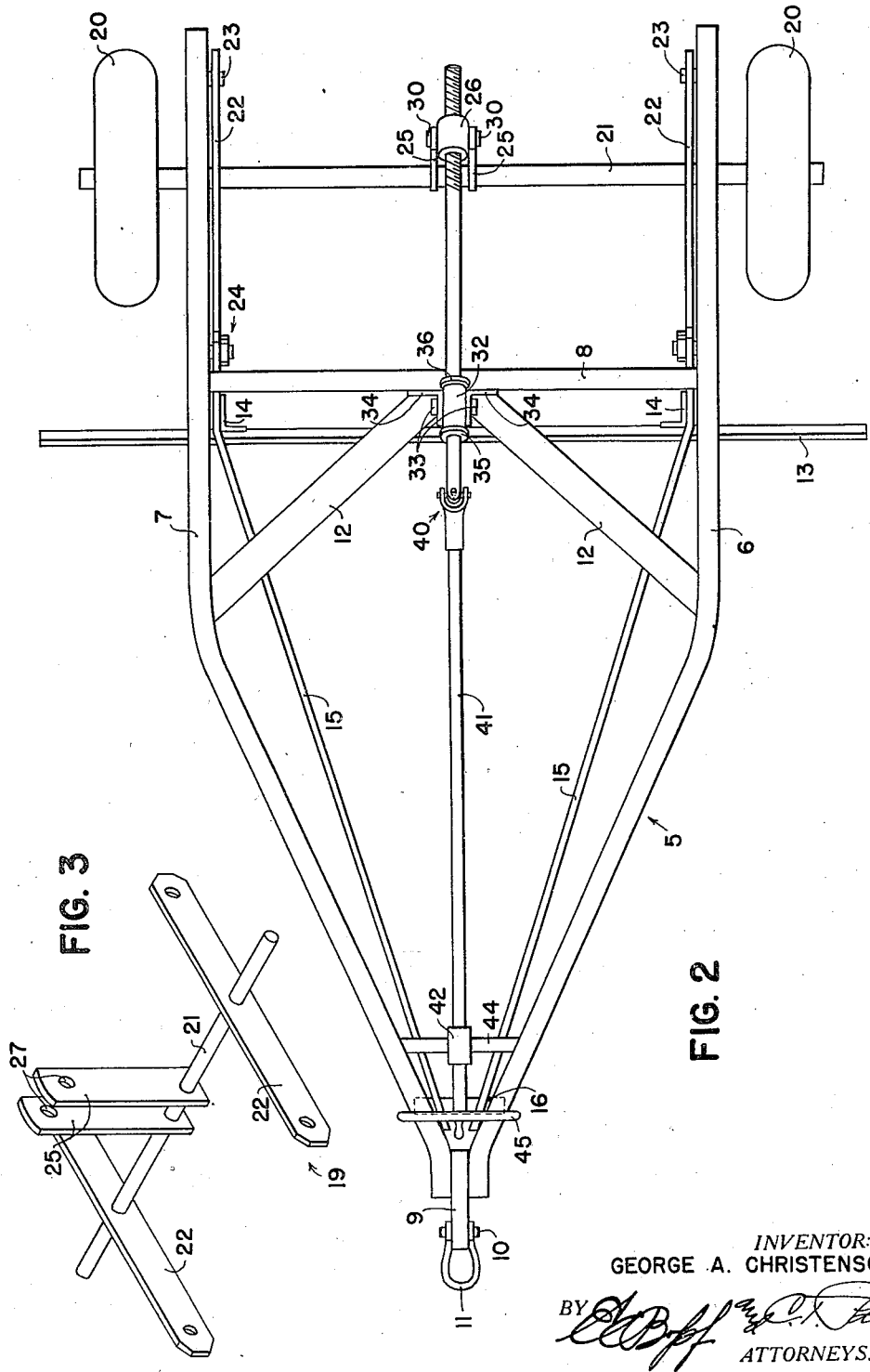
INVENTOR:
GEORGE A. CHRISTENSON
ATTORNEYS.

Patented Jan. 13, 1942

2,269,519

UNITED STATES PATENT OFFICE 2,269,519

LAND LEVELER

George A. Christenson, Bell, Calif., assignor to Killefer Manufacturing Corporation, Los Angeles, Calif., a corporation of California Application March 14, 1940, Serial No. 323,913

9 Claims. (Cl. 37—169)

The present invention relates to ground working implements and is more particularly concerned with that class of implements known as land levelers or road scrapers. The principal object of the present invention is to provide a new and improved implement of this type embodying a novel construction whereby the weight of the frame is utilized to counterbalance the weight of the tool, thereby facilitating vertical adjustment of the tool relative to the frame.

Other objects and advantageous features of my invention will become apparent after consideration of the following detailed description of the preferred embodiment thereof, reference being had to the accompanying drawings, in which Figure 1 is a side elevation of a land leveler constructed according to the principles of the present invention;

Figure 2 is a plan view of the same; and

Figure 3 is a perspective view, drawn to a reduced scale, of the axle assembly.

Figure 1:
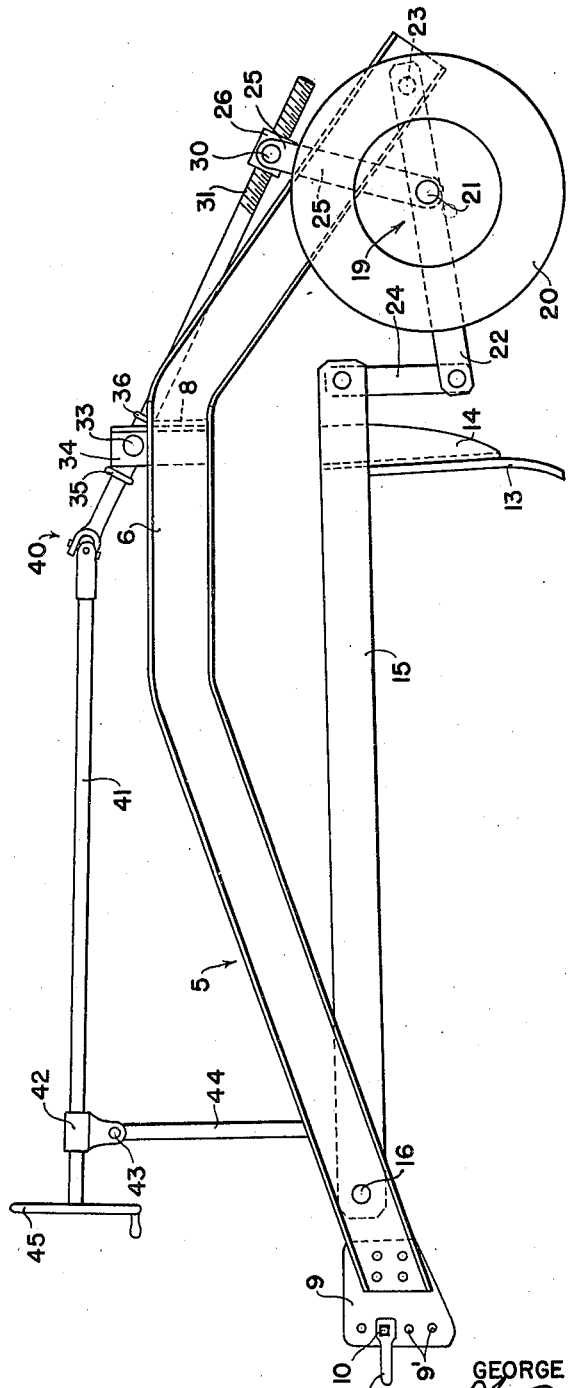

Referring now to the drawings, the main draft frame 5 of the land leveler comprises a pair of generally fore and aft extending frame members 6 and 7 connected together intermediate of their ends by a transverse beam 8. The front ends of the frame bars 6, 7 converge forwardly and are disposed on opposite sides of a draft attachment plate 9. The plate 9 is provided with vertically spaced holes 9' for receiving at different heights the coupling pin 10 of a hitch clevis 11 through which draft connection may be made with the drawbar of a tractor in a well known manner. Bracing members 12 are fixed to the frame members 6, 7 and converge rearwardly to points of connection with the cross beam 8 near the midpoint of the latter.

A ground working tool in the form of a transversely disposed scraper blade 13 is carried at the lower ends of a pair of laterally spaced standards 14 fixed to a pair of forwardly converging tool beams 15, the front ends of which are pivoted for vertical swinging on a transverse pivot bolt 16 fixed to the frame members 6, 7 near the front ends thereof.

The rear end of the frame 5 is carried on a supporting frame 19 comprising a transversely disposed axle 21 having a pair of laterally spaced ground engaging wheels 20 journaled thereon. A pair of laterally spaced, fore and aft extending levers 22 are fixed intermediate of their ends to the axle 21. Each of the levers 22 has its rear end pivotally connected at 23 to the rear end of the adjacent frame member 6, 7 for vertical swinging movement. The front end of each lever 22 is connected by means of a link 24 to the rear end of the adjacent tool beam 15, and by this arrangement it will be seen that the levers 22 are, in effect, fulcrumed on the horizontal axle 21 so that the weight of the tool beams 15 and blade 13 on one end of the levers 22 is balanced by the weight of the frame 5 on the other ends of the levers. This counterbalancing action is utilized to facilitate vertical adjustment of the tool 13 relative to the frame, such adjustment being accomplished by means which will now be described.

Fixed to the midpoint of the axle 21 and extending upwardly therefrom are two arms 25 which are spaced apart to receive between them a trunnion block 26 having laterally extending pins 30 journaled in aligned apertures 27 provided in the arms. A shaft 31 extends through the trunnion block 26 in threaded engagement therewith and is journaled near its front end in a thrust bearing 32. The bearing member 32 has laterally projecting trunnion pins 33 which are journaled in the adjacent flanges of two laterally spaced angle iron brackets 34 fixed to and extending upwardly from the cross brace 8. Collars 35 and 36 are fixed to the shaft 31 and bear against opposite ends of the bearing 32 so that end thrust forces in the shaft 31 are transmitted through the bearing 32 to the frame 5.

The front end of the shaft 31 extends for a short distance beyond the bearing 32 and is connected by a universal joint 40 to a forwardly extending shaft 41. The shaft 41 is journaled at its front end in a bearing 42 pivotally connected at 43 to the top of an upright brace 44 which is suitably fixed to the frame members 6, 7. A hand wheel 45 mounted on the front end of the shaft 41 enables the operator to turn the shafts 41, 31 from his station on the tractor, thereby moving the trunnion block 26 along the threaded portion of the shaft 31 and rocking the supporting frame structure 19 to adjust the vertical position of the blade 13 with respect to the frame 5. The threads on the shaft 31 and block 26 are of such pitch that they are self locking, therefore the tool blade is fixedly held in adjusted position, and the weight of the frame 5 thus acts downwardly during operation against the tool to hold the latter in the ground.

From the above description it will be seen that the ground working tool of a machine constructed in accordance with the principles of my invention can be adjusted vertically with a minimum of effort on the part of the operator since the weight of the tool and supporting beams is counterbalanced by the weight of the frame.

What I claim as my invention is:

1. A land leveler comprising a main draft frame, a tool beam connected therewith for vertical swinging movement, a supporting frame structure having one end connected with said draft frame and the other end thereof connected with said tool beam, and a ground wheel journaled on said supporting frame structure intermediate the ends thereof.

2. An implement of the class described comprising a frame, a tool carrying beam having one end thereof pivotally connected with said frame for vertical swinging, and ground engaging support means connecting the frame with the other end of the tool beam whereby the weight of the latter is counterbalanced by the weight of the frame.

3. An implement of the class described comprising a generally fore and aft extending main frame, a tool carrying beam connected with said frame near one end thereof for relative vertical movement, a ground support, and a second frame rockably mounted intermediate of its ends on said ground support, one end of said second frame being connected with said main frame and the other end thereof being connected with the tool beam whereby the weight of the tool is counterbalanced by the weight of the frame.

4. An implement of the class described comprising a generally fore and aft extending frame, a tool carrying beam pivotally connected with said frame near the front end thereof for vertical swinging movement, link means having one end connected with the rear end of said frame and the other end connected with said tool beam, and ground support means connected with said link means intermediate the ends thereof whereby the weight of the frame causes an upwardly directed force to be exerted against the tool.

5. A land leveler comprising a frame, a scraper blade connected therewith for relative vertical movement, a ground support, a lever fulcrumed on said ground support and connected at one end thereof with said frame, and means connecting the other end of the lever with said scraper blade.

6. An implement of the class described comprising a generally fore and aft extending frame having hitch means at the front end thereof adapted for connection to the drawbar of a tractor, a tool carrying beam pivoted to said frame near the front end thereof for vertical swinging movement, a lever pivoted to the rear end of said frame for vertical swinging and connected with said tool beam, an axle fixed to said lever between the points of connection with the frame and the tool beam, a ground wheel journaled on said axle, and means for rocking said lever about the axis of said wheel to raise or lower the tool with respect to the frame.

7. An implement of the class described comprising a generally fore and aft extending frame having hitch means at the front end thereof adapted for connection to the drawbar of a tractor, a ground working tool disposed generally transverse to the line of forward travel of the implement, means connecting the tool to the frame for relative vertical swinging, a transversely disposed axle having a pair of laterally spaced ground wheels journaled thereon, a pair of laterally spaced fore and aft extending levers fixed intermediate their ends to said axle, each of said levers having one end pivoted on said frame and the other end connected with said tool, and means for rocking said levers about the axis of said axle to raise or lower the tool with respect to the frame.

8. An implement of the class described comprising a generally fore and aft extending frame having hitch means at the front end thereof adapted for connection to the drawbar of a tractor, a tool carrying beam swingably connected with said frame near the front end thereof for vertical movement, a transversely disposed axle located adjacent the rear end of the frame, a pair of laterally spaced ground wheels journaled on the axle, a pair of laterally spaced fore and aft extending levers fixed intermediate their ends to said axle, the rear end of each of said levers being connected with said frame, link means connecting the front ends of said levers with said tool beam, an arm fixed to the axle, and means connected with the arm for rocking the axle and levers to adjust the tool vertically with respect to the frame.

9. An implement of the class described comprising a generally fore and aft extending main frame having hitch means at the front end thereof adapted for connection to the drawbar of a tractor, a tool carrying beam pivoted to said main frame near the front end thereof for vertical swinging movement, a supporting frame connected with the rear end of said main frame and with said tool carrying beam for relative vertical movement, an axle connected with said supporting frame between the points of connection with the main frame and tool carrying beam, a ground wheel mounted on said axle for rotation, and means for adjusting the tool beam vertically with respect to the main frame, the weight of said main frame substantially counterbalancing the weight of the tool beam.

GEORGE A. CHRISTENSON.